(12) United States Patent
Spanevello

(10) Patent No.: US 9,677,677 B2
(45) Date of Patent: Jun. 13, 2017

(54) CHECK VALVE WITH FLEXIBLE MEMBRANE

(71) Applicant: MGI COUTIER, Champfromier (FR)

(72) Inventor: Marco Martino Spanevello, Venasque (FR)

(73) Assignee: MGI COUTIER, Champfromier (FR)

( * ) Notice: Subject to any disclaimer, the term of this patent is extended or adjusted under 35 U.S.C. 154(b) by 47 days.

(21) Appl. No.: 14/375,287

(22) PCT Filed: Feb. 8, 2013

(86) PCT No.: PCT/FR2013/050275
§ 371 (c)(1),
(2) Date: Jul. 29, 2014

(87) PCT Pub. No.: WO2013/117876
PCT Pub. Date: Aug. 15, 2013

(65) Prior Publication Data
US 2014/0373953 A1    Dec. 25, 2014

(30) Foreign Application Priority Data

Feb. 9, 2012 (FR) ...................... 12 51211

(51) Int. Cl.
*F16K 15/14* (2006.01)
*F16K 27/02* (2006.01)

(52) U.S. Cl.
CPC .......... *F16K 15/144* (2013.01); *F16K 15/148* (2013.01); *F16K 27/0209* (2013.01); *Y10T 137/789* (2015.04); *Y10T 137/7895* (2015.04)

(58) Field of Classification Search
CPC .. F16K 15/148; F16K 27/0209; F16K 15/144; Y10T 137/7895
(Continued)

(56) References Cited

U.S. PATENT DOCUMENTS 198,071 A * 12/1877 Blake .................... F16K 15/148
 137/512.15
3,827,456 A * 8/1974 Sheppard .............. F16K 11/022
 137/859

(Continued)

FOREIGN PATENT DOCUMENTS

CN         201705473 U     1/2011
DE    10 2010 022 410 A1   12/2011
(Continued)

OTHER PUBLICATIONS

International Preliminary Report on Patentability issued in International Application No. PCT/FR2013/050275 on Aug. 12, 2014 (with translation).

(Continued)

*Primary Examiner* — Kevin Lee
*Assistant Examiner* — P. Macade Nichols
(74) *Attorney, Agent, or Firm* — Oliff PLC

(57) ABSTRACT

The valve includes a body, a seat and a flexible membrane capable of being urged against the seat, while plugging passage ports of this seat. The passage ports have each an oblong shape and are arranged with their greatest dimensions oriented along radial directions of the seat. Applications: check valve or flow control valve for gaseous fluids, in particular in the automotive field.

7 Claims, 5 Drawing Sheets

Figure 1:
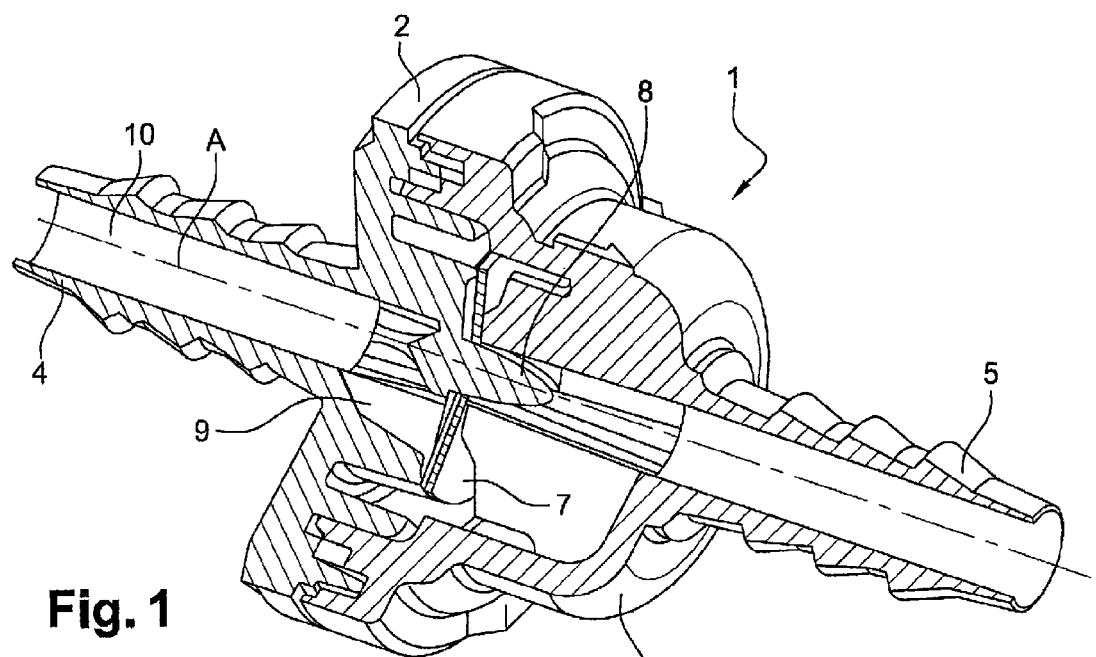

(58) Field of Classification Search
USPC .................................. 137/854, 843, 512.15
See application file for complete search history.

(56) References Cited

U.S. PATENT DOCUMENTS

| | | | |
|---|---|---|---|
| 4,470,412 A | | 9/1984 | Nowacki et al. |
| 5,375,621 A | | 12/1994 | Gaehwiler |
| 5,971,723 A | * | 10/1999 | Bolt .................. F04B 13/00 137/854 |

FOREIGN PATENT DOCUMENTS

| | | |
|---|---|---|
| EP | 0 560 221 A1 | 9/1993 |
| EP | 1 314 920 A2 | 5/2003 |
| FR | 1321824 | 3/1963 |

OTHER PUBLICATIONS

May 15, 2013 International Search Report issued in International Application No. PCT/FR2013/050275.

\* cited by examiner

CHECK VALVE WITH FLEXIBLE MEMBRANE

BACKGROUND OF THE INVENTION

The present invention relates, in general, to the technical field of the check valves or the flow control valves, intended to be inserted in circuits through which fluids flow, in particular gaseous fluids. More particularly, this invention relates to the structure of a check valve of the type having a flexible membrane, and yet more particularly to the "seat" portion of such a valve, that is to say the portion on which the membrane is urged in the closing position of the valve, preventing the passage and more precisely the backflow of the fluid. The check valve with flexible membrane, subject-matter of the invention, finds applications in particular in the automotive field, inside various systems which utilize depression for their operation.

In automotive vehicles, there are various systems which utilize depression to ensure functions related to the operation of the heat engine or to the driving and to the safety of the vehicle: variable-geometry turbocharger, exhaust gas recirculation system (EGR), assisted brake pressure amplifier, etc. The depression is also utilized to ensure some depollution functions, such as the purging of the vapors absorbers on gasoline-fuelled vehicles, or the recycling of the crankcase gases.

For vacuum piloting or assisting functions, the depression is created by the intake in the case of an atmospheric gasoline engine, or by a vacuum pump driven by the camshaft of a diesel engine or a turbocharged gasoline engine, or still by an electric pump, and this depression is maintained by a check valve.

In the case of brake assistance, a vacuum check valve is installed to guarantee that the vacuum is preserved in all circumstances, including the case of switch off of the vacuum generation source, in particular in case of shutdown of the vehicle engine, in order to preserve the brake assistance. Well maintaining the depression thus constitutes a security requirement and a lot of efforts are made to guarantee a depression maintenance time as long as possible, after shutdown of the engine, and to reduce the vacuum (re)establishing time in the brake assistance circuit.

In the case of the management of flows of gasoline vapors and/or oil vapors, particularly for depollution functions, the vapors must be injected in the engine air intake in order to be burnt in the latter. For a turbocharged engine, depending on the turbocharger speed, these vapors are injected upstream or downstream of the turbocharger. In addition, pressurizing the turbocharger should not affect the operation of the vapors recycling system. Thus, it is essential to equip the circuits of this system with one or more check valve(s), to control the gaseous flows. For example, in an oil vapor recycling system, two check valves are provided, with one first check valve inserted on a vapor injection duct upstream of the turbocharger, and one second check valve inserted on a vapor injection duct in the air intake, downstream of the turbocharger, this last valve having to resist the turbocharger pressure.

The check valves currently utilized in this kind of applications include various closing means. Among these, the valves with plastic bodies, utilizing as a closing means a flexible rubber membrane, constitute the majority of current achievements. As an example of a check valve with membrane, reference is made to patent document EP 1 314 920 A2, in which the membrane is maintained by its periphery in the body of the valve.

There are also known achievements of check valves with membrane, in which the membrane, pierced in its center, is fastened on a central pin which is itself carried by the seat of the valve, the periphery of the membrane being free in that case—see patent document CN 201705473 U.

In such a check valve, in the closing position, sealing is ensured by:
a surface contact between the periphery of the membrane and the circular outer edge protruding from the seat,
a surface contact of the membrane with one face of the seat,
and also, in the case of a membrane assembled on a central pin, an interference between the edge of the central hole of the membrane and the periphery of the pin.

The contact at rest, that is to say in the absence of differential pressure, between the membrane and the seat, is obtained by a permanent elastic deformation of the membrane, itself resulting both from the conforming of the body and of the seat of the valve and from the positioning of the membrane itself.

The requirements usually imposed on this kind of check valves consist in having a valve with very low opening pressure and pressure drops in the passing direction of the fluid, and also in having a good pressure resistance in the direction opposite to the flow.

These requirements are contradictory, because they impose to have, on the one hand, a very flexible membrane and great passage sections for the fluid, and in the other hand, little ports and a relatively rigid membrane.

Usually, the passage of the fluid inside the valve, in the passing position, is achieved by circular ports arranged in the seat under the membrane. These circular ports are particularly arranged all around the central pin on which the membrane is maintained.

The current circular shape of the ports exhibits important drawbacks.

First, the circular shape of the ports is not optimal from the point of view of the available flowing section for the gaseous flow. Thus, it causes high pressure drops, which is penalizing in the applications where it is desirable to have a maximum flow rate, for example to optimize a depollution function.

Furthermore, in the case of vacuum piloting or assisting functions, it is necessary to be capable of establishing the vacuum as quickly as possible, so as to have the energy source constituted by this vacuum as soon as possible. A limited passage section and high pressure drops do not allow obtaining, for the valve, good performances in terms of vacuum establishing time for this kind of applications.

Moreover, the circular ports have a sharp-ridged edge, without rounding. Thus, in the case where the membrane must resist a certain pressure in the non-passing direction of the valve, for example during the turbocharger startup, the absence of rounding causes an important local stress on the membrane, with risks of crackings or even tearings of this membrane.

BRIEF SUMMARY OF EMBODIMENTS

The present invention aims to eliminate the drawbacks previously mentioned, and it thus seeks to optimize the check valves with flexible membranes of the kind considered here, that is to say to reduce as much as possible the pressure drops and also the vacuum establishing time, while increasing the resistance of valves to the pressure in the non-passing direction, this by a simple technical solution which does not increase the footprint of the valve and does not complicate its structure.

To this end, the object of the invention is a check valve with a flexible membrane, the valve comprising a hollow body, a seat arranged inside the body transversally thereto, the seat being provided with passage ports, and a flexible membrane capable of being urged against the seat while plugging the passage ports, or being spaced apart from said ports, the membrane being maintained by its center or by its periphery for example on a central pin carried by the seat, this check valve being essentially characterized by the fact that the passage ports of the seat have each an oblong shape and are arranged with their greatest dimensions oriented along radial directions of this seat, in particular in a radiating manner around the central pin.

Thus, according to the principle of the invention, the passage ports of the seat of the check valve are no longer circular ports, but oblong ports which, all together, have a "daisy" arrangement.

For a seat of a given diameter, such oblong ports may be more numerous than circular ports, and better cover the surface of the seat, so as to increase the total passage section of the fluid, hence to reduce the pressure drops and the vacuum establishing time, without reducing the useful supporting surface of the membrane on the seat.

Typically, the oblong shape of the passage ports allows, for a valve seat of given dimensions, replacing five conventional circular ports with eight oblong ports according to the invention, which offers a significant potential gain for the total passage section (the sum of the passage sections of all the ports).

In addition, the increase in the number of the passage ports, hence in the number of solid areas of the seat as well, located between two consecutive ports, allows bringing these solid areas closer against each other and, therefore, improving the support of the membrane against the seat, in the non-passing state. This results in a limitation of "waves" on the periphery of the membrane in contact with the edge of the seat, hence an improvement of the sealing achieved by the valve, as well as a preservation of the membrane itself of which the mechanical resistance to pressure, in the non-passing direction, is increased, the membrane tearing risk being thus reduced.

A contribution to this "waves" limitation is also provided by the presence of curvilinear segments of which the optimized geometry allows improving the support of the membrane on the surface of the seat and minimizing the deformation of the membrane under the effect of the depression.

Advantageously, the passage ports have a rounded-profile edge, at least at the exit of these ports on the face of the seat turned towards the membrane, which limits the stress applied on the membrane urged against that face and contributes to preserving the integrity of that membrane, even after a long period of use of the valve and numerous openings/closings thereof. In particular, one thus avoids membrane marking under the effect of pressure, which may constitute a starting point for cracking of the membrane.

As it can be easily understood, by intervening only at the level of the seat of the check valve, the invention does not modify the geometry and the outer dimensions of the valve. In addition, it does not complicate the structure of the valve and does not make it more costly, the specific shapes of the seat and in particular of its passage ports capable of being directly obtained by molding, whereas the outer body of the valve and the membrane may preserve their usual design, as well as the assemblies of these components. Thus, the invention has a great ease of implementation.

According to one embodiment of the invention, each passage port is defined, on the face of the seat turned towards the membrane:
  by two radial edges extending globally along respective radial directions,
  by one proximal edge interconnecting the two radial edges,
  by one distal edge interconnecting the two radial edges, the distal edge extending farther from the other passage ports than the proximal edge.

Passage ports thus defined, with radial edges, allow maximizing the outflow section or total passage section relative to the total surface area of the seat, which allows forming a compact check valve.

According to one alternative of the preceding embodiment, the distal edge is composed of a middle segment, preferably substantially rectilinear, and two curvilinear segments, each curvilinear segment connecting the middle segment to one respective radial edge, the middle segment having, along a tangential direction, a length lower than half of the greatest width of the passage port.

Thus, such a length and such a width define a clearly curved distal edge, which contributes to limiting the deformation of the membrane, hence its damage.

The greatest width of the passage port is the distance separating the two intersection points between the curvilinear segments and the radial edges.

Preferably, each curvilinear segment has a convex curvature from the inside toward the outside of the passage port.

According to another alternative of the preceding embodiment, the ratio characterizing the oblong shape and having:
  as numerator, the length of the passage port, measured according to a radial direction between the proximal edge and the middle segment, and
  as denominator, the greatest width of the passage port
  is higher than 1.3.

Thus, such a ratio sizes an optimal oblong shape which allows replacing five conventional circular ports with eight oblong ports, which offers an important gain in the total passage section.

According to yet another alternative of the preceding embodiment, the ratio having:
  as numerator, the greatest width of the passage port, and
  as denominator, the distance separating two consecutive passage ports, measured parallel to a tangential direction,
  is lower than 2.7.

Thus, such a ratio allows ensuring a uniform support of the membrane while minimizing the risk of reducing the fluid passage section.

Furthermore, the invention is compatible with all types of valves with membrane, in particular:
  valves with an integrated seat or with a seat in the form of a specific insert,
  valves with a lubricated or non-lubricated membrane,
  valves with a membrane maintained on a central pin or retained by any mean, whether in its center or at its periphery,
  valves and particularly valve bodies assembled by any technique: welding, snapping, screwing, . . . .

BRIEF DESCRIPTION OF THE SEVERAL
VIEWS OF THE DRAWINGS

In any case, the invention will be better understood with the help of the following description, with reference to the accompanying schematic drawing representing, as examples, some embodiments of this check valve with a flexible membrane.

Figure 2:
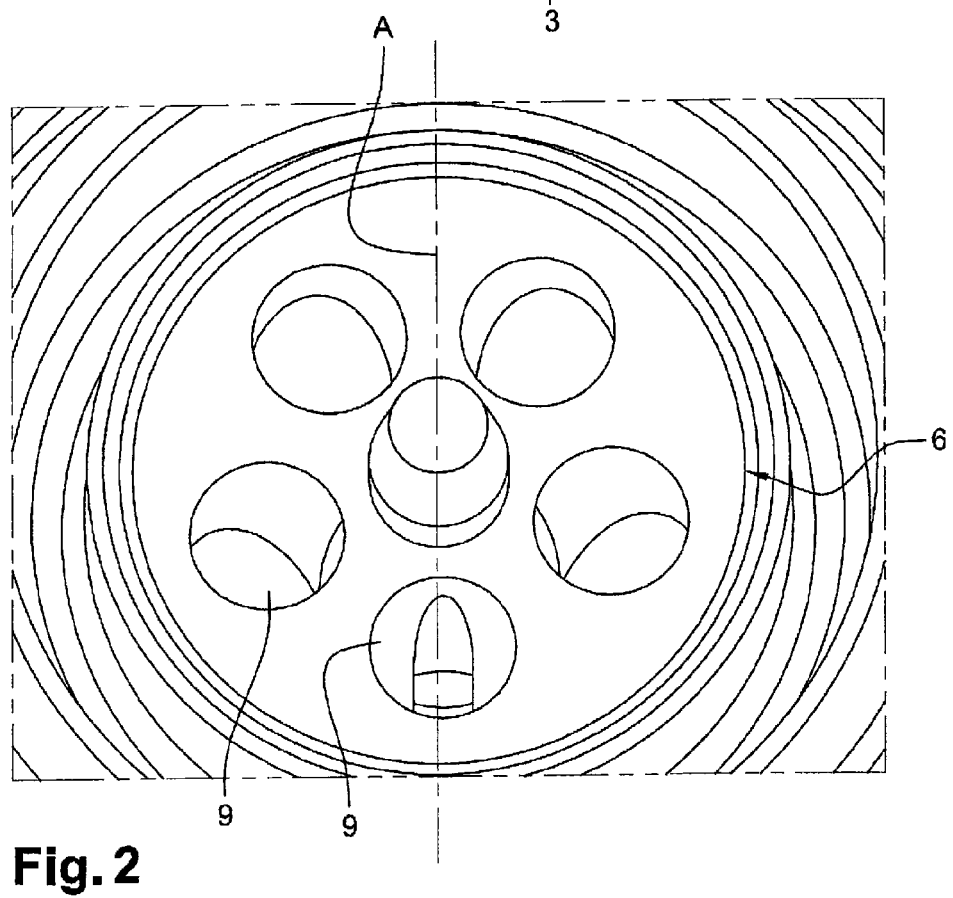
Figure 3:
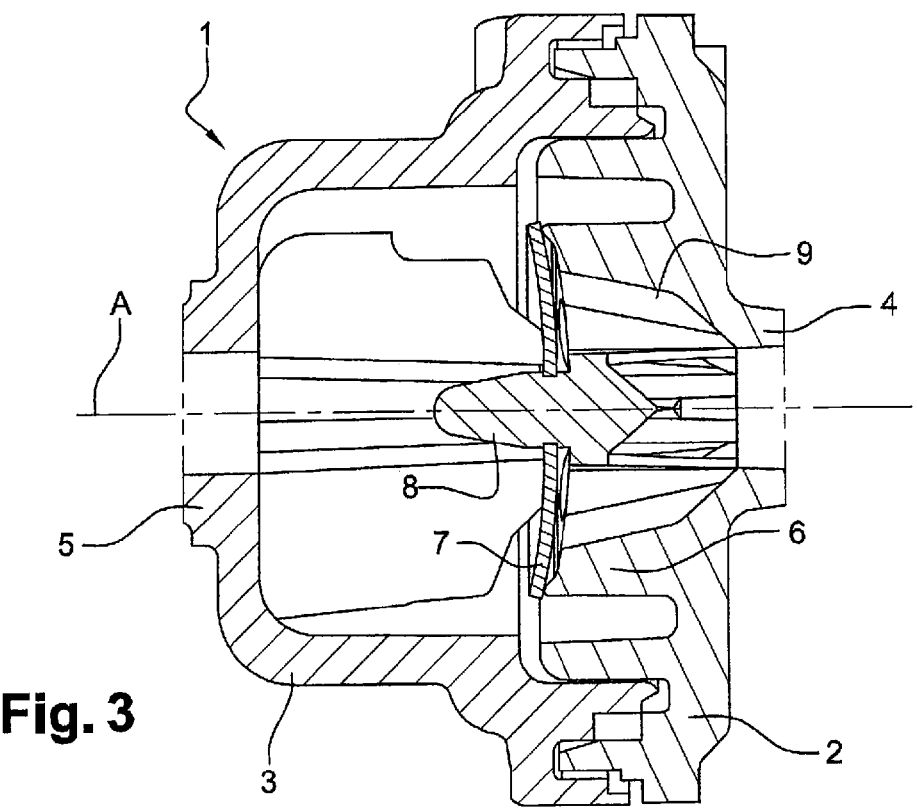
Figure 4:
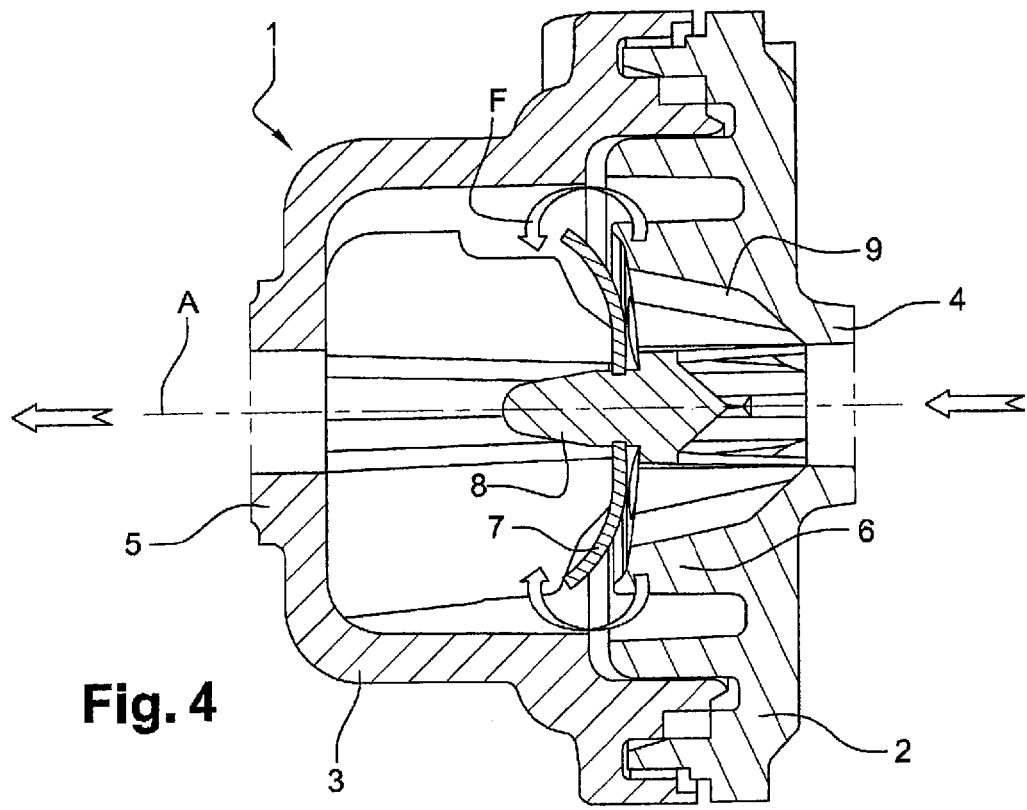
Figure 5:
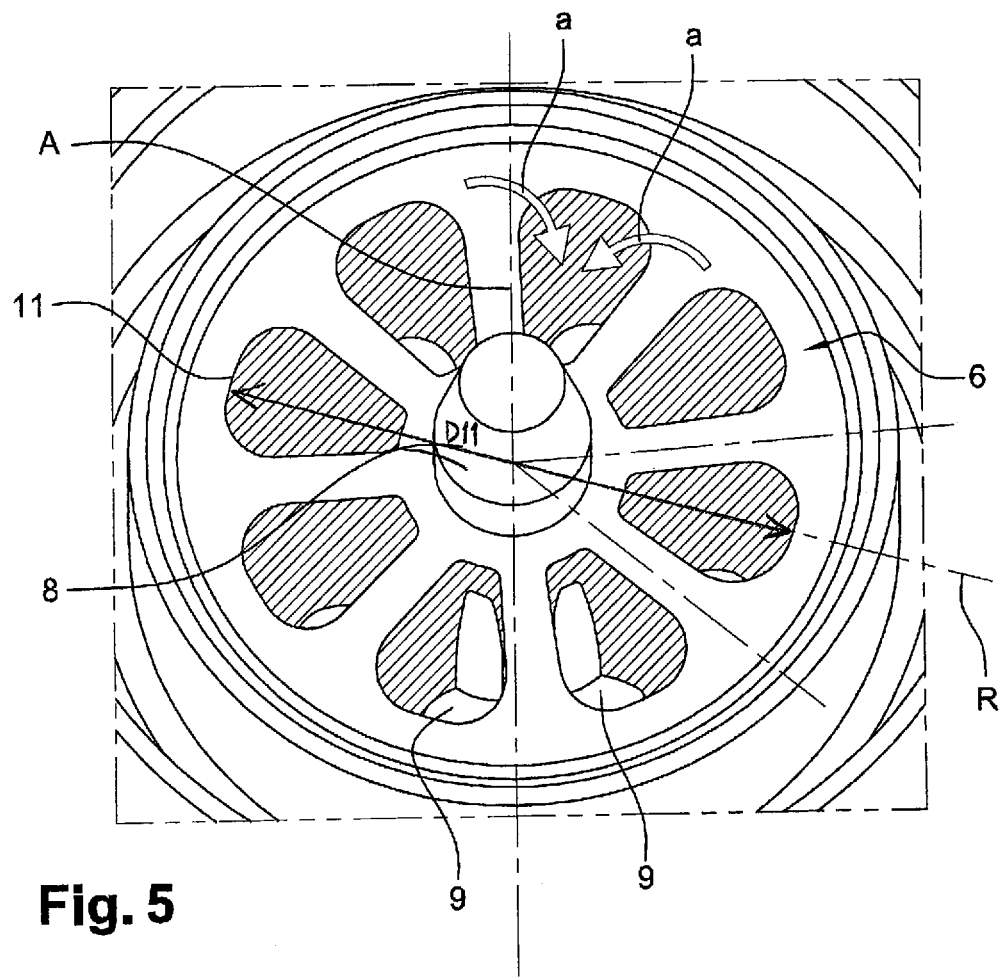
Figure 8:
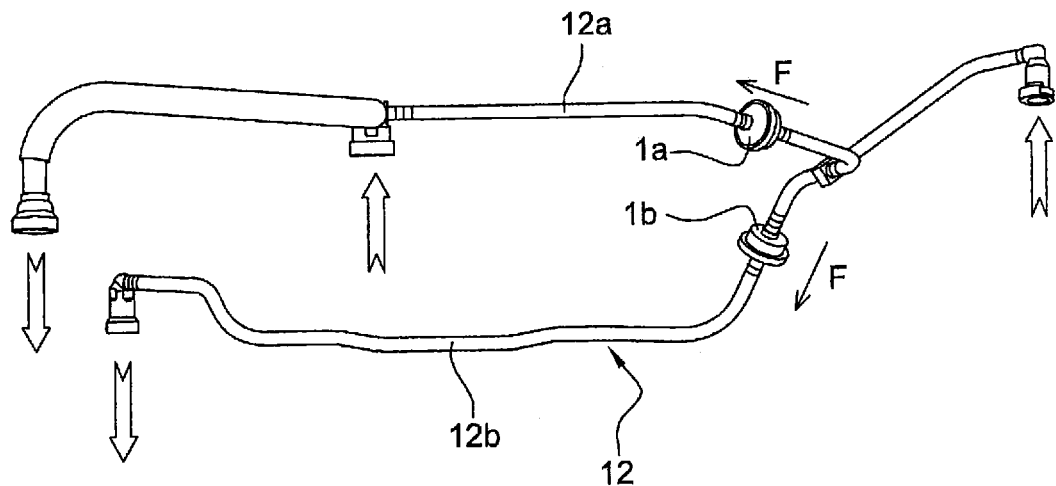
Figure 5A:
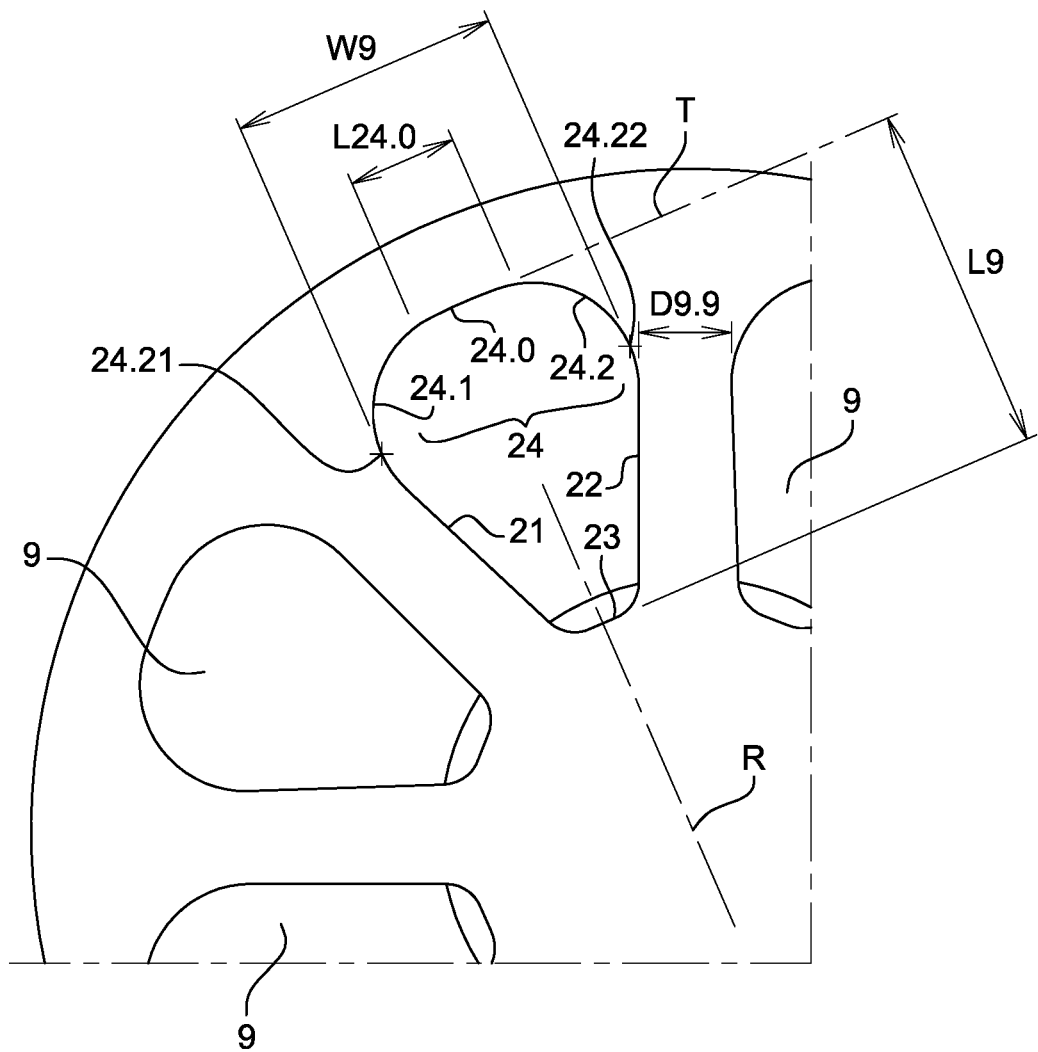
Figure 6:
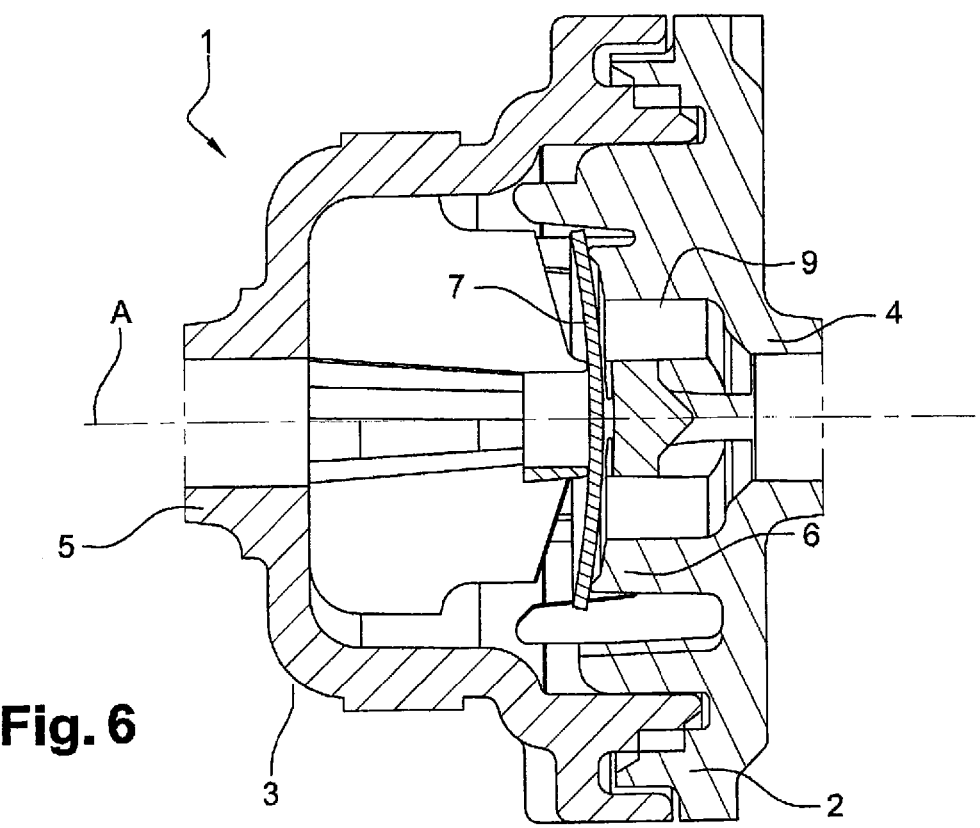
Figure 7:
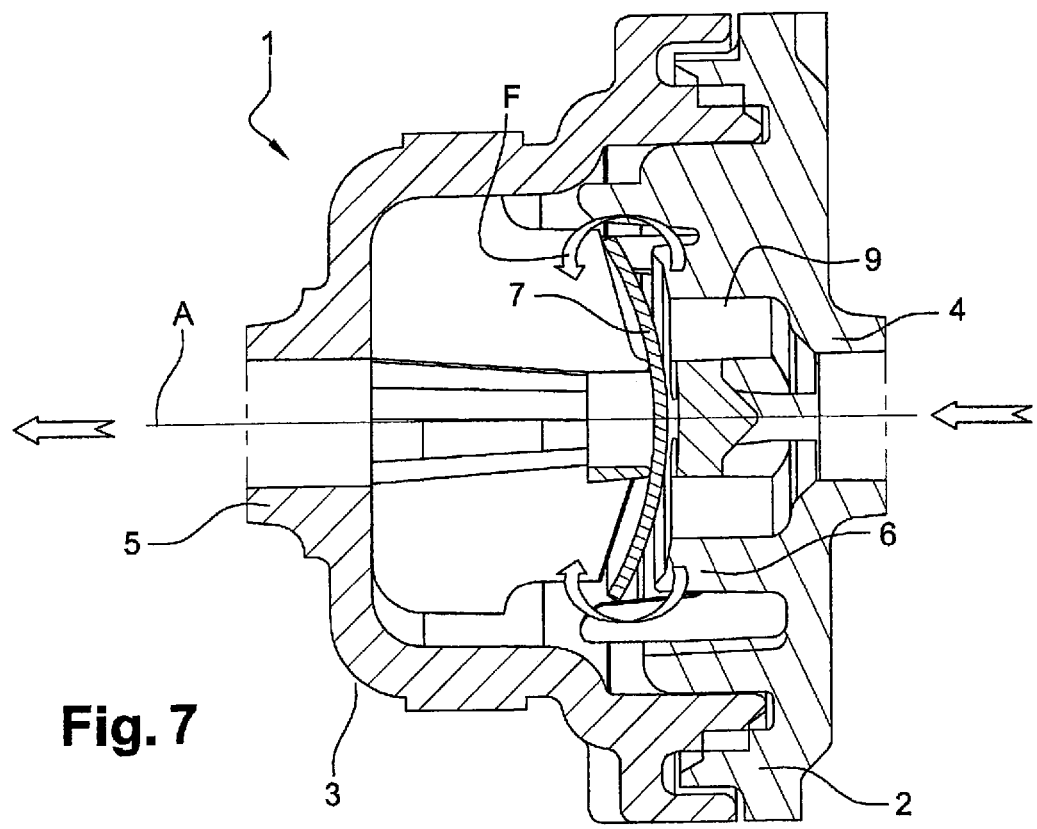

FIG. 1 is a perspective and longitudinal section view of a check valve with a flexible membrane, FIG. 2 illustrates a seat of a check valve with conventional circular ports, FIG. 3 is a partial sectional view through the axis of a valve in accordance with the invention, in the closing position, FIG. 4 is a view similar to FIG. 3, representing the valve in the opening position, FIG. 5 shows the seat of the valve according to the invention, with its oblong-shaped ports, FIG. 5A is a front view of a portion of the seat of the valve of FIG. 5, on a larger scale, FIG. 6 is a sectional view through the axis of another valve in accordance with the invention, in the closing position, FIG. 7 is a view similar to FIG. 6, showing the valve in the opening position, and FIG. 8 illustrates an example of application of the check valve subject-matter of the invention.

DETAILED DESCRIPTION

Referring to FIGS. 1, 3, 4, 6 and 7, a check valve, designated as a whole by the reference 1 and hereinafter simply called "valve", comprises a hollow body composed of two joined portions 2 and 3, arranged along a same longitudinal axis A. The first portion 2 of the body is extended by an inlet end-piece 4 for a fluid, while the second portion 3 of this body is extended by an outlet end-piece 5 for the fluid.

A seat 6, here integrated into the first portion 2 of the body, extends transversally to the longitudinal axis A. A flexible membrane 7, of a circular shape, is mounted inside the body, opposite to one face of the seat 6, the membrane 7 being here fastened by its center. In particular, as illustrated in FIGS. 1, 3 and 4, the membrane 7 may be maintained on a central pin 8, integral with the seat 6.

The seat 6 is pierced with a plurality of passage ports 9, arranged all around the axis A and in particular the central pin 8. The ports 9 communicate with the internal channel 10 formed by the inlet end-piece 4.

In the closing position of the valve 1, as illustrated in FIG. 3, a fluid pressure at the outlet end-piece 5 side (or a depression at the inlet end-piece 4 side) urges the membrane 7 against one face of the seat 6, so that this membrane 7 plugs all the ports 9, thus preventing any fluid backflow.

In the opening position of the valve 1, as illustrated in FIG. 4, the membrane 7 is "detached" from the seat 6 and authorizes the fluid circulation, in a direction called "passing" (arrow F), from the inlet end-piece 4 toward the outlet end-piece 5 through the ports 9.

As shown in FIG. 2, the passage ports 9 are conventionally of a circular shape, and few in number, typically five. These circular ports usually have sharp-ridged edges.

According to the invention, and as represented in FIG. 5, the passage ports 9 have each an oblong shape. More particularly, the greatest dimension of each port 9 is oriented along a radial direction R of the seat 6. All of the ports 9 thus have a "daisy" arrangement, these ports 9 being for example eight in number and separated by regular angular intervals of 45°.

Each port 9 has rounded angles, in the plane of the seat 6. In addition, the edge 11 of each port 9, at the exit of that port on the face of the seat 6 turned toward the membrane 7, has a rounded profile, in a plane perpendicular to said face of the seat 6, as suggested by the small arrows a. Two diametrically opposed edges 11 are separated by a distance D11, represented in FIG. 5, which is here about 11 mm.

In the embodiment according to FIGS. 3 to 5, the passage ports 9 have a radiating arrangement around the central pin 8, on which the membrane 7 is retained.

As shown in FIG. 5A, each passage port 9 is defined, on the face of the seat 6 turned towards the membrane 7:
- by two radial edges 21 and 22 globally extending along respective radial directions R, separated by an angle of about 40 degrees,
- by one proximal edge 23 interconnecting the two radial edges 21 and 22,
- by one distal edge 24 interconnecting the two radial edges 21 and 22, the distal edge 24 extending farther from the other passage ports 9 than the proximal edge 23; the distal edge 24 corresponds to the edge 11.

The distal edge 24 is composed of a middle segment 24.0, preferably substantially rectilinear, and two curvilinear segments 24.1 and 24.2. Each curvilinear segment 24.1 and 24.2 is here arc-shaped. The middle segment 24.0 is here rectilinear.

Each curvilinear segment 24.1 or 24.2 connects the middle segment 24.0 to one respective radial edge 21 or 22. The middle segment 24.0 has, along a tangential direction T, a length L24.0 lower than half of the greatest width W9 of the passage port 9. In this case, the length L24.0 measures 0.9 mm and the greatest width W9 measures 2.35 mm. This length L24.0 and this greatest width W9 define a distal edge 24 relatively curved.

The greatest width W9 of the passage port 9 is defined as the distance separating the two intersection points 24.21 and 24.22 between the curvilinear segments 24.1 and 24.2 and the radial edges 21 and 22.

In the example of FIG. 5A, the length L9 of the passage port 9 is about 3.2 mm and the greatest width W9 of the passage port 9 between the intersection points 24.21 and 24.22, is about 2.35 mm.

The ratio characterizing the oblong shape and having:
- as numerator, the length L9, measured according to a radial direction R between the proximal edge 23 and the middle segment 24.0, and
- as denominator, the greatest width W9 is about 1.36, hence higher than 1.3. This ratio offers an important gain in the total passage section.

Moreover, another ratio having:
- as numerator, the greatest width W9 of the passage port 9, and
- as denominator, the distance D9.9 separating two consecutive passage ports 9, measured parallel to a tangential direction T, and which is here about 0.9 mm, is about 2.6, hence lower than 2.7.

This ratio allows guaranteeing a uniform support of the membrane while minimizing the risk of reducing the fluid passage section.

FIGS. 6 and 7 represent, respectively in the closing position and in the opening position, another embodiment wherein the membrane 7 is maintained by its center thanks to a particular configuration of the second portion 3 of the body of the valve, without resort to a fastening central pin. In this case, the passage ports 9 are still oblong-shaped, but they have a radiating arrangement around the longitudinal axis A of the valve 1.

In all its embodiments, the check valve 1 according to the invention, with its oblong-shaped passage ports 9, has a global passage section (in the opening position) at least equivalent to that of conventional circular ports according to FIG. 2, while offering a better support of the membrane 7, hence an improved sealing (in the closing position).

Furthermore, the invention allows reducing the unit size of each port 9 relative to circular ports, which reduces the force exerted at the ports 9 in case of overpressure and thus improves the pressure resistance of the membrane 7 in the non-passing direction. The shape of the ports 9, associated to the rounding a of the edges 11 of these ports, contributes for a same membrane 7 to increasing the pressure resistance of that membrane, hence to its resistance against tearing, the gain in the pressure resistance could amount to several bars.

FIG. 8 illustrates one possible application for check valves according to the invention. Two valves are here incorporated into an oil vapors recycling circuit 12 associated with the cylinder-head-cover in a turbocharged engine. A first valve 1a is inserted at the start of a circuit branch 12a terminating upstream of the turbocharger. A second valve 1b is inserted at the start of another circuit branch 12b which terminates downstream of the turbocharger, at the engine air intake. The arrows F indicate the passing direction of the two valves 1a and 1b. The second valve 1b must here resist the turbocharger pressure.

It goes without saying that the invention is not limited to the sole embodiments of this check valve with flexible membrane which have been described above, as examples; it encompasses, on the contrary, all the alternative embodiments and applications respecting the same principle. It is in this way, in particular, that there would be no departure from the scope of the invention:
  by modifying the detail of shapes and the number of the ports arranged in the seat of the valve,
  by modifying and adapting the ratio between the global passage section resulting from said ports, and the supporting surface of the membrane,
  by achieving these ports in a seat of any type, integrated into a portion of the valve body or designed as a separate part,
  by applying the invention to a valve with a membrane fastened by any means, in its center or on its periphery,
  by reserving this valve for circuits of fluids of any kind: air or other gases, vapors, gases loaded with droplets for example of oil in the case of crankcase gases recycling circuit, and even liquid transfer circuits, in the automotive field or in other activity sectors.

The invention claimed is:

1. A check valve with a flexible membrane, the check valve comprising:
  a hollow body;
  a seat disposed inside the hollow body transversely thereto, said seat being provided with passage ports; and
  the flexible membrane capable of being urged against the seat while plugging said passage ports thereof, or being spaced apart from said passage ports, said flexible membrane being maintained either by a center of said flexible membrane or by a periphery of said flexible membrane, wherein said passage ports have each an oblong shape such that each passage port has a greatest dimension and a smallest dimension, each passage port being disposed such that the greatest dimension is oriented along a respective radial direction of said seat,
  wherein each of said passage port is defined, on a face of said seat turned towards said flexible membrane by:
    two radial edges globally extending along respective radial directions,
    a proximal edge interconnecting said two radial edges, and
    a distal edge interconnecting said two radial edges, said distal edge extending radially farther than said proximal edge, and
  said distal edge is composed of one middle segment, and of two curvilinear segments, each curvilinear segment connecting said middle segment to one respective radial edge, said middle segment having, along a tangential direction, a length lower than half of a greatest width of said passage port.

2. The check valve according to claim 1, wherein said passage ports have an edge having a rounded profile, at least at an exit of said passage ports on the face of said seat turned towards said flexible membrane.

3. The check valve according to claim 1, wherein said middle segment is substantially rectilinear.

4. The check valve according to claim 1, wherein a ratio characterizing the oblong shape and having:
  as a numerator, a length of said passage port, measured according to a radial direction between said proximal edge and said middle segment, and
  as a denominator, a greatest width of said passage port is higher than 1.3.

5. The check valve according to claim 1, wherein a ratio having:
  as a numerator, a greatest width of said passage port, and
  as a denominator, a distance separating two consecutive passage ports, measured parallel to a tangential direction,
  is lower than 2.7.

6. The check valve according to claim 1, wherein said flexible membrane is maintained on a central pin carried by said seat, said passage ports being arranged in a radiating manner around said central pin.

7. A flow control check valve with a flexible membrane, the flow control check valve comprising:
  a hollow body;
  a seat disposed inside the hollow body transversely thereto, said seat being provided with passage ports; and
  the flexible membrane capable of being urged against the seat while plugging said passage ports thereof, or being spaced apart from said passage ports, said flexible membrane being maintained either by a center of said flexible membrane or by a periphery of said flexible membrane, wherein said passage ports have each an oblong shape such that each passage port has a greatest dimension and a smallest dimension, each passage port being disposed with the greatest dimension oriented along a respective radial direction of said seat,
  wherein each of said passage port is defined, on a face of said seat turned towards said flexible membrane by:
    two radial edges globally extending along respective radial directions,
    a proximal edge interconnecting said two radial edges, and
    a distal edge interconnecting said two radial edges, said distal edge extending radially farther than said proximal edge, and
  said distal edge is composed of one middle segment, and of two curvilinear segments, each curvilinear segment connecting said middle segment to one respective radial edge, said middle segment having, along a tangential direction, a length lower than half of a greatest width of said passage port.

* * * * *